(12) United States Patent
Dermler et al.

(10) Patent No.: US 6,766,007 B1
(45) Date of Patent: Jul. 20, 2004

(54) METHOD, APPARATUS, AND COMMUNICATION SYSTEM FOR SETTING UP A COMMUNICATION SESSION

(75) Inventors: Gabriel Dermler, Adliswil (CH); Claudio Fleiner, San Jose, CA (US); Marcel Graf, Kilchberg (CH); Lukas Heusler, Zurich (CH); Hong Linh Truong, Richterswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/483,359

(22) Filed: Jan. 14, 2000

(30) Foreign Application Priority Data

Jan. 29, 1999 (EP) .............................................. 99101918

(51) Int. Cl.[7] .......................... H04M 3/42; H04M 1/56; H04L 12/66; G06F 15/16
(52) U.S. Cl. ............................ 379/201.01; 379/207.02; 379/142.08; 379/229; 370/352; 709/245
(58) Field of Search ....................... 379/201.01, 210.01, 379/215.01, 142.08, 88.19, 210.02, 211.01, 211.02, 207.02, 229, 230; 370/352; 709/206, 204, 217, 245

(56) References Cited

U.S. PATENT DOCUMENTS

| | | | |
|---|---|---|---|
| 4,899,358 A | | 2/1990 | Blakeley ...................... 379/67 |
| 5,333,266 A | * | 7/1994 | Boaz et al. .................. 709/206 |
| 5,471,519 A | * | 11/1995 | Howe et al. ............. 379/88.26 |
| 5,481,594 A | | 1/1996 | Shen et al. .................... 379/67 |
| 5,526,406 A | * | 6/1996 | Luneau ........................ 455/563 |
| 5,710,803 A | | 1/1998 | Kowal et al. .................. 379/41 |
| 5,729,592 A | * | 3/1998 | Frech et al. ............. 379/88.19 |
| 5,782,642 A | * | 7/1998 | Goren .................... 434/307 R |
| 5,832,060 A | * | 11/1998 | Corlett et al. ............ 379/88.19 |
| 6,041,103 A | * | 3/2000 | La Porta et al. ........... 379/67.1 |
| 6,188,886 B1 | * | 2/2001 | Macaulay et al. .......... 455/415 |
| 6,233,325 B1 | * | 5/2001 | Frech et al. ............ 379/142.06 |
| 6,278,704 B1 | * | 8/2001 | Creamer et al. ............ 370/352 |
| 6,347,333 B2 | * | 2/2002 | Eisendrath et al. ......... 709/217 |
| 6,385,305 B1 | * | 5/2002 | Gerszberg et al. ....... 379/88.13 |
| 6,425,131 B2 | * | 7/2002 | Crandall et al. ............ 725/106 |
| 6,434,599 B1 | * | 8/2002 | Porter ........................ 709/204 |
| 6,493,445 B2 | * | 12/2002 | Garland et al. ............. 379/243 |

FOREIGN PATENT DOCUMENTS

| EP | 084477312 | 10/1997 | ............ H04M/1/57 |
|---|---|---|---|
| JP | 59168756 | 9/1984 | ............ H04M/1/57 |

OTHER PUBLICATIONS

"ISDN Protocols for Connection Control" by W. Harmon & CF Newman, IEEE Journal of Selected Areas in Communications vol. 7, No. 7, Sep. 1989, pp. 1034 to 1042.

* cited by examiner

Primary Examiner—Benny Tieu
(74) Attorney, Agent, or Firm—Louis P. Herzberg

(57) ABSTRACT

A telephone session between a calling person and a called person uses a call-related information segment which has been prepared by the calling person to inform the called person of the calling person and the subject of the session. The call-related information is transmitted to the called person and outputted there by use of an output unit, alerting the called person of the nature of the telephone session without the called person entering into the telephone session.

18 Claims, 3 Drawing Sheets

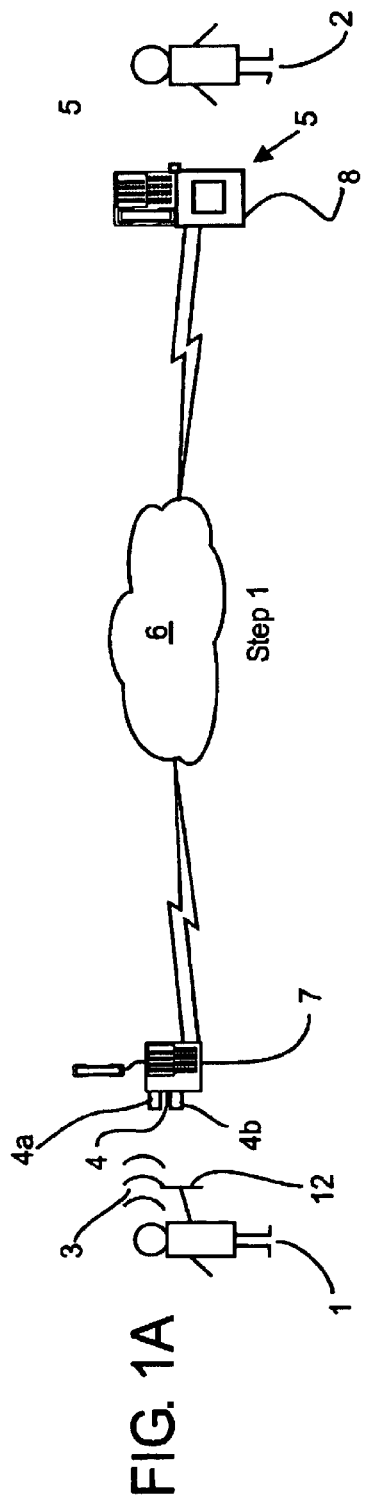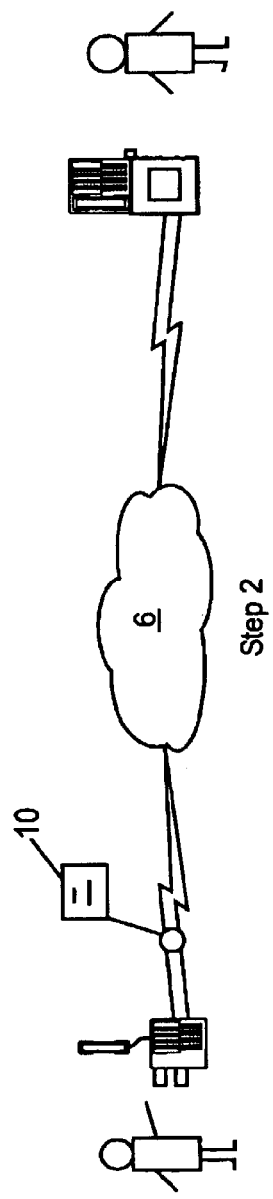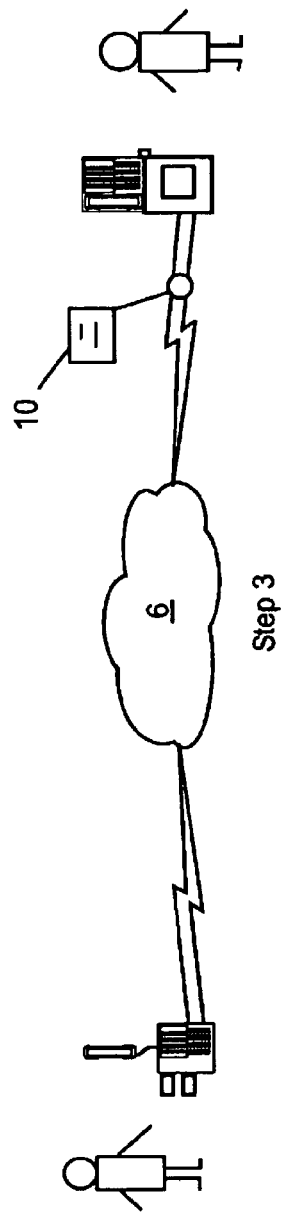
FIG. 1A
FIG. 1B
FIG. 1C

METHOD, APPARATUS, AND COMMUNICATION SYSTEM FOR SETTING UP A COMMUNICATION SESSION

TECHNICAL FIELD

The present invention is related to a method, an apparatus, and a communication system for setting up a communication session. More particularly, the invention relates to a telephone or conference connection and allows the participating users a sophisticated identification.

BACKGROUND OF THE INVENTION

The development in the field of communication built new standards in the last couple of years. For example, the analog telephone technology switched to a digital technology that opens new fields and possibilities. Single media-types, e.g. text, speech, data-files, or even video, are merging more and more through new multimedia technologies and thereby creating interesting new applications.

In e-mail communication, the subject line is an important feature to both the sender and the receiver of the e-mail message. With the information contained in this field, the sender usually tries to draw the attention of the recipient to the purposes of the message. The receiver of an e-mail message can use the content of this field to evaluate the importance of the message and to decide whether to read it immediately or later.

With current telephone systems, there is however no feature available that is equivalent to the e-mail subject line. At most, what can be sent to the called party is the telephone number of the calling party, if the respective telephone set has a display. This information may help the called party to decide whether he/she should answer the call. For example, a calling line identification that is the number of the calling party's telephone is sent in the integrated service digital network (ISDN) in the out-of-band D-channel that is used for call control signaling.

In some systems, the calling party's number is also used to select the ringing tones or to retrieve the name and/or photo of the calling person, as disclosed in U.S. Pat. No. 4,899,358.

Exploiting the calling party's number as described above has two weaknesses:

The information content of the calling party's number is limited. It may tell the called party who is calling; it is not possible for example to tell him the reasons or purposes of the call.

In some cases the information may be misleading as to "who is calling", since only the calling party's number is provided and not by the actual calling person. If Jane is using Bob's phone to call Joe, her call will be displayed at Joe's phone set as a call from Bob.

U.S. Pat. No. 5,821,874 is related to a messaging terminal with voice notification. A method for receiving and processing an incoming message in a wireless messaging terminal is disclosed.

In U.S. Pat. No. 5,276,731 is described a method and apparatus for handling incoming telephone calls. The method can be used for delivering predetermined messages to predetermined calling parties or predetermined, prioritized screening of incoming telephone calls, and for rerouting incoming telephone calls the basis of predetermined selection criteria An emergency phone messaging system is disclosed in U.S. Pat. No. 5,710,803. This system is provided for automatically dialing and sending out a pre-recorded message in emergency situations to Police, Fire, or Ambulance departments at the push of a single button.

U.S. Pat. No. 5,481,594 describes an audio caller identification unit which is connected between a user's telephone an a telephone exchange providing calling party identification, such as calling number or name.

In the following, two standards, H.323 and Q.931, are addressed.

H.323 is a multimedia teleconferencing standard and was originally developed as an adaptation of H.320, which addresses videoconferencing over ISDN and other circuit switched networks and services. Since H.320 was ratified, in 1990, corporations have increasingly implemented Local Area Networks (LANs) and LAN gateways to the Wide Area Network (WAN). H.323 has evolved beyond a logical and necessary extension of the H.320 standard to include Corporate Intranets and packet-switched networks generally. H.323 utilizes the Real-Time Protocol (RTP/RTCP) from the IETF (Internet Engineering Task Force), along with internationally standardized codecs. With the ratification of version 2, H.323 is also being used for video and other communications, over the Internet. In common with the other ITU multimedia teleconferencing standard, H.323 applies to multipoint and point-to-point sessions. More details about H.323 can be found in: ITU-T, "Recommendation H.323 (02/98)—Packet-based multimedia communications systems", Geneva, February 1998.

Q.931 is an Integrated Service Digital Network (ISDN) specification that has been designed for control signaling and thus is only used on the D channel. It is used to establish maintain and release connections on B channels. It is a protocol between the user and the network. More details about Q.931 can be found in: ITU-T, "Recommendation Q.931 (03/93)—Digital Subscriber Signalling System No. 1 (DSS 1)—ISDN user-network interface layer 3 specification for basic call control", Geneva, March 1993.

SUMMARY OF THE INVENTION

It is an object of the invention to provide a method which allows the initiator of a phone call to attach to his/her call a "subject" object. At the called party's side the subject object can then be "rendered", thus giving to the called party more information about the reasons or purposes of the call.

The present invention relates generally to a communication session, more specifically, to the set up of a telephone call between a calling party and a called party. Hence, a call-related information that is determined from the calling party is transmitted to the called party and identifies the calling party or the purpose of the call. The use of the term "a communication session" is meant all activities which take place during the establishment, maintenance, and release of a call. According to the invention at least two persons participate on a session. Furthermore, such a session can be a text chat call that usually takes place via the Internet.

The "subject" object attached to a phone call may be of any kind, e.g. a line of text, an audio file, an video file, a bitmap, a photo or image, an animation, some means of identity proof, etc. It may be also a combination of multiple objects, e.g. a line of text and the corresponding audio file. The calling party either creates such an object or selects it for example from a repository.

There are two methods of how the "subject" object can be transferred to a destination:

1. The "subject" object itself and its type is encoded within a signaling message which is sent from the calling to the called party during the call setup phase. For example, in Q.931-based signaling system like ISDN or H.323, the signaling message in question may be the SETUP message; in the session initiation protocol (SIP) the "subject" would be sent in the INVITE message. The MIME (Multipart Internet Mail Extension) encoding scheme used in e-mail systems for file attachment can be used to encode the object. At the destination side, the "subject" object is then "displayed" or "rendered" to the called party at call offering time. For a wider range of applications some standards should be extended.

2. Only a reference to the "subject" object, e.g. its URL (Uniform Resource Locator), is sent within the signaling message mentioned in method 1 above. Upon receiving the signaling message containing the URL, the destination endsystem will download the encoded object from the location indicated by the URL and "render" it to the called user at call offering time. This second method is interesting in case the size of the encoded object is too large for being included into the signaling message.

The following can be achieved with a "subject" object attached to a phone call: indication of who is calling (via text, audio/video clip, photo, . . . ), authentication of the calling party, e.g., recognition of the voice of the calling party, indication of the purposes of the call indication of urgent or emergency calls, transfer of a real-time short message (text, audio, video, . . . ) then hang up, whereas a message in e-mail or GSM is not real-time.

As mentioned, at the destination side the "subject" object can be "displayed" or "rendered" to the called party. The term "display" is used in a very general sense of "processing the content of the object". The outcome of the processing may lead to a call offering (ringing), possibly with some kind of information display, or to a re-direction of the call to another destination, e.g. in a call center case to an agent which is more competent on the subject, but also to the rejection of the call.

Similar to the "subject" object sent from the calling to the called party, the called party can also send an object to the calling party as an immediate reply to his call, e.g. indicating why he/she cannot answer the call yet, proposing another time for calling him.

If the call-related information has been defined by a calling person or selected, then the advantage occurs, that a called person knows exactly who is sending the call and can decide whether he/she takes the call or not.

When the call-related information comprises an indication of the purpose of the session or an indication of the urgency of said session, then the advantage occurs, that the called person knows already the topic of the session and is prepared, or in case of an emergency the called person can handle immediately.

The call-related information are creatable by identifying the calling person through a sensor, e.g. a voice-analyzer, a scanner, a camera, or the like, which provides a huge variety of creating the call-related information.

If the call-related information is transformed to a visible, audible, tactile, smellable, or tastable information and is indicated as text, photo, image, graphic, animation, audio clip, video clip, combinations thereof or by initiating a device, then the advantage occurs, that the called person can be informed in different ways. This is especially advantageous for handicapped people.

When the call-related information is transmitted and the session is afterwards interrupted, then the advantage occurs, that the called person get a real-time information and can react immediately.

It is advantageous if the call-related information is transmitted during the establishment of a communication session, because the call-related information can be displayed, rendered, signalized, or outputted before the communication starts.

If the call-related information is processed by a called device to make a decision on the handling of the call, then the advantage occurs, that in a call center case, i.e. the called device belongs to a service station, the call-related information can be handled and processed in a more competent way, e.g. rendering only some kind of information, transforming the call-related information, routing the call to another destination, or even rejecting the call.

DESCRIPTION OF THE DRAWINGS

The invention is described in detail below with reference to the following schematic drawings.

FIGS. 1A to 1E show a schematic illustration of an application with steps to be taken in accordance with the present invention where a person sends call-related information to another person.

All the figures are for the sake of clarity not shown in real dimensions, nor are the relations between the dimensions shown in a realistic scale.

DETAILED DESCRIPTION OF THE INVENTION

In the following an exemplary implementation of the present invention is described in connection with FIG. 1.

Figure 1D:
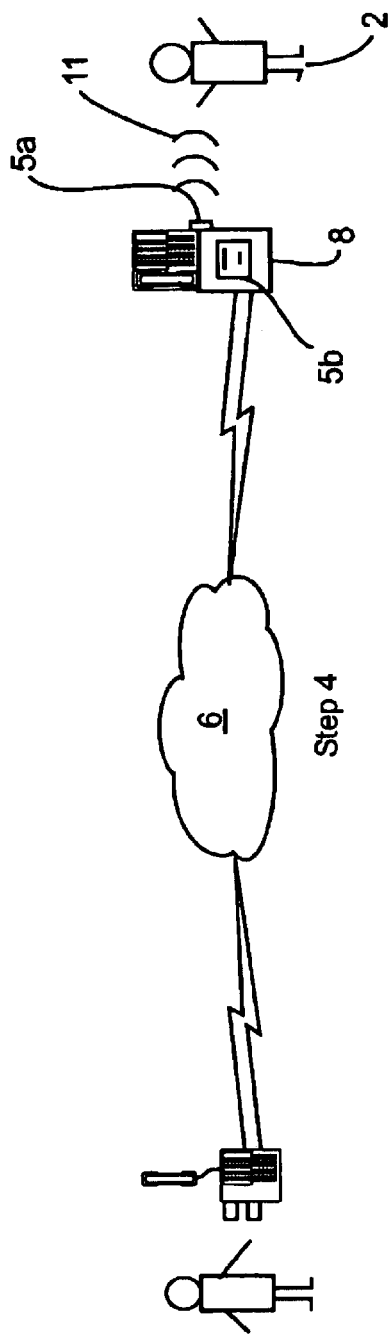
Figure 1E:
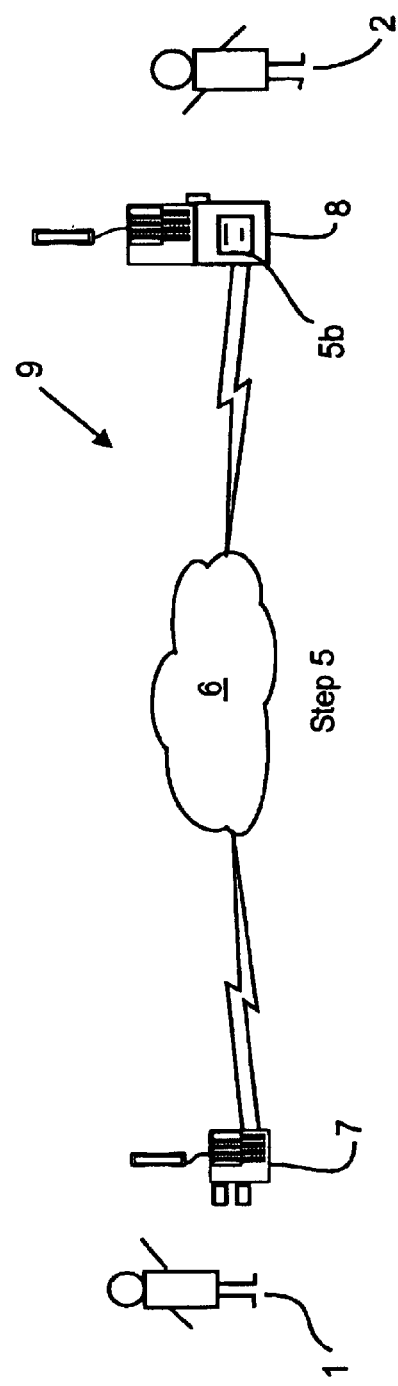

FIG. 1 shows a multistep schematic illustration of an establishment of a telephone call 9 where a calling person 1 sends a call-related information 3 to a called person 2. The first step, indicated by 1., depicts the calling person 1, a calling device 7 that comprises a sensor 4 and on the other hand the called person 2, a called device 8 that comprises a output unit 5. The calling device 7 is connected to a network 6, which can be any kind of network, e.g. a telephone network, an Intranet, or even the Internet. The called device 8 is also connected to the network 6.

In the following the calling device 7 and the called device 8 is addressed in more detail.

First, the calling device 7 is an ISDN telephone with extended features. That means the device 7 includes a microphone with a digital recorder in order to record audio signals. That telephone might comprise further sensors 4, for instance, a voice-analyzer, a camera, a bar-code reader, a keyboard, a notepad, a scanner, a device for the identification of a person, a place, an environment, or even a scent. For the purpose of the invention, with a call-related information 3 is meant any kind of information that can be outputted or displayed to the called person 2 in form of text, speech, music, jingle, picture, image, animation, graphic, video and the like. The term "displayed" is here used in a very general sense of "processing the information". The outcome of the processing may lead to a call offering, possibly with some kind of information display, or to a re-direction of the call to another destination. The call-related information 3 can be stored as data. These data can be compressed and therewith the call-related information 3 can be sent in a signaling message, e.g. implemented in the SETUP message in Q.931-based systems. Further, the calling device 7 can be a computer, a multimedia computer or device, an embedded device, or any other kind of device that is able to handle a communication session. This session is establishable via the Internet by using IP (Internet protocol) packets. The IP telephony uses the standard H.323 where user-to-user information can be sent in an easy and efficient way. Another advantage of IP is that any data format can be sent within the packets and that therefore the call-related information 3 can be easily retrieved when it is referenced by an URL.

The standards Q.931 and H.323 are incorporated by reference in their entirely.

Second, the called device 8 is a device having those features or parts of device 7 described above. The called device 8 firther comprises the output unit 5 which can be a speaker, a sound-system, a monitor, a display, a screen, a printer, a device for rerouting the call-related information 3, or any other device that is able to output or display the call-related information 3 to the called person 2.

Turning now to step 1 of FIG. 1 where call-related information 3 is created. At first, the calling person 1 speaks a call-related sentence and shows a call-related document 12 to the calling device 7. For the sake of simplicity, the calling device 7 is depicted as advanced telephone set having the features as described above. The sensor 4 that here is a microphone 4a coupled to a voice-analyzer and a snapshot camera 4b, records the sentence and take a picture of the document. This call-related information 3 is digitized and provided as data.

Then the calling person 1 starts the establishment of the telephone call 9 by pressing a button as indicated in the second line in step 2. For the sake of simplicity, in step 2. as well as in the next following steps the structure and therefore the numbering is the same as described and depicted above. The call-related information 3 is implemented and sent to the network 6 in a SETUP message 10 in the case of using ISDN and the standard Q.931. When using IP and H.323 then the call-related information 3 can be implemented and sent to the network 6 in a SETUP message.

In the next step, step 3., the SETUP message 10 with the call-related information 3 is routed through the network 6 and has not arrived yet at the called device 8.

Step 4., where the call-related information 3 has passed the network 6, shows the outputting of an alerting signal 11 containing the call-related sentence to the called person 2 by using the output unit 5 which in this case is a speaker 5a. Furthermore, the call-related document is shown in a display 5b. At this point in time the called person 2 is informed already by the outputted voice and the displayed document about the importance of the call. Hence, people can react much faster to the content of a call and do not need time-wasting explanations. In case of a played music or jingle, the calling person and the relevance of the call might be recognized by one called person if many people are in the proximity of the output of the call-related information 3.

Finally, step 5. indicates that the calling device 7 and the called device 8 are connected via the network 6 and hence the calling person 1 and the called person 2 engaged in conversation. The telephone call 9 is established, the status of the telephone call 9 is CONNECT, and the communication via the network 6 starts. The called person 2 is now informed about the topic of the call in advance and sees the displayed document on the display 5b.

Some or all aspects of the present invention can be realized in hardware, software, or a combination of hardware and software. When realized as software, this software when executed by a processor of the calling device 7 or the called device 8 controls the respective system such that it performs the present method.

Figure 2:
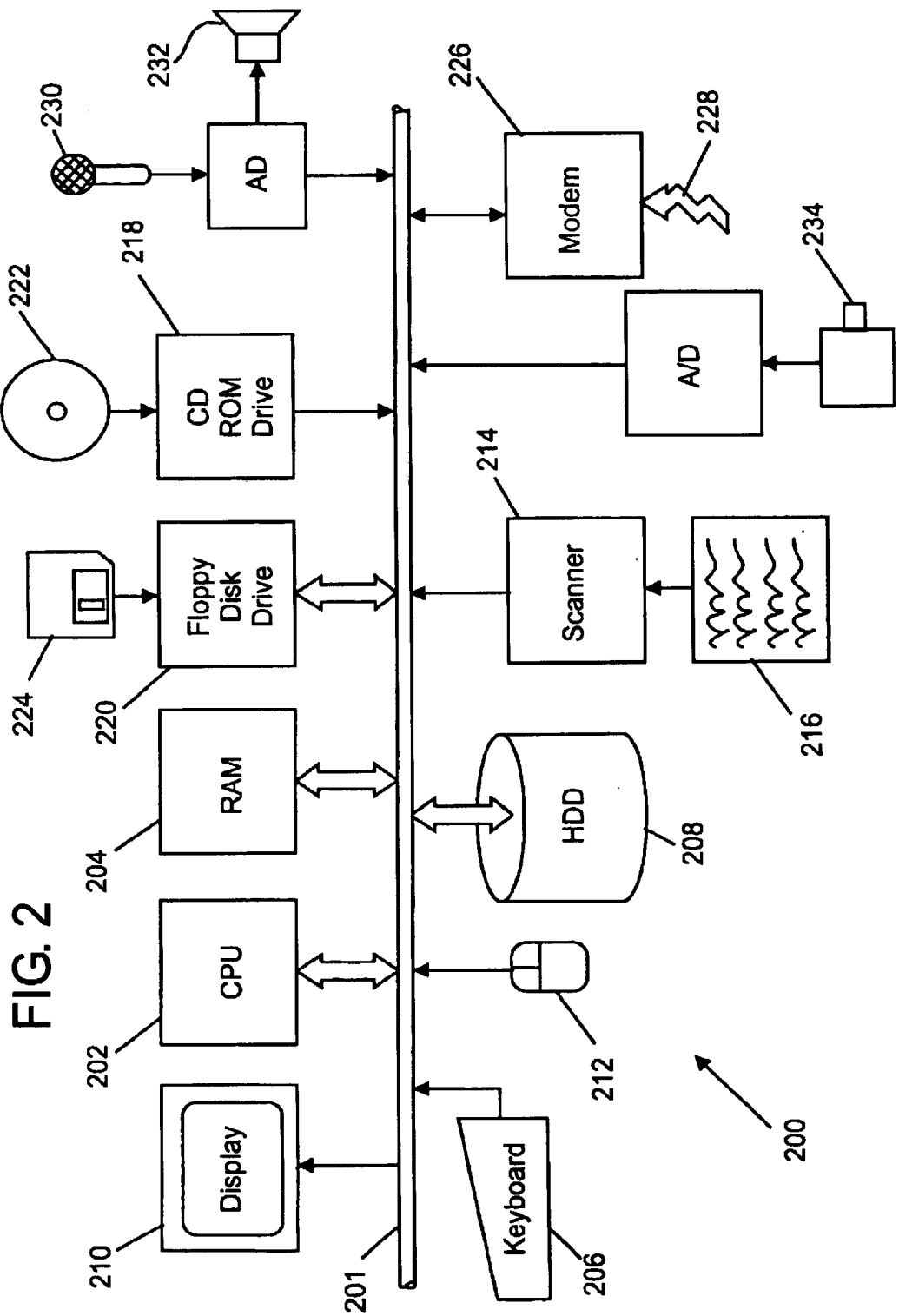
FIG. 2 is a block diagram of a computer system which the present invention is applicable.

The present invention is capable of running, at either the calling or called location, on any properly configured general purpose computer system, such as the one shown in FIG. 2. Such a computer system 200 includes a processiing unit (CPU) 202 connected by a bus 201 to a random access memory 204, a high density storage device 208, a keyboard 206, a display 210 and a mouse 212. Also attached to the CPU 202 by the bus 201, are a scanner 214 for scanning docunents 216 into the computer 200; and CD-ROM and magnetic disc drivers 218 and 220 for entry of information from optical and floppy magnetic disc mediums 222 and 224 containing the program code and data of the present invention. An example of such a computer is a Aptiva Personal Computer of the International Business Machines Corporation with a Pentium processor of Intel Corporation operating under Microsoft Windows 98 operating system of the Microsoft Corporation.

The computer 200 also contains a modem 226 for telecommunication of information 228 on telephonic networks. To carry on a telephonic communication session, the computer includes a microphone 230, a speaker 232 and a video camera 234, each connected to the bus 201 by an appropriate analog to digital or digital to analog converter.

It should be clear to those skilled in the art that a number of changes can be made in what has been disclosed. Therefore, it should be understood that the present invention is not limited to the disclosed embodiment, but also encompasses those changes falling within the spirit and scope of the appended claims.

What is claimed is:

1. A method of setting up a telephonic communication session between a calling person and an available called person at an open phone line characterized by the calling person:

providing call related information on an input device contemporaneously with an attempt at establishing a communication link on the open phone line without first establishing the communication link to said available called person by said calling person, which information is related to said calling person or the subject of said session wherein a reference to the call related information in the form of a Uniform Resource Locator (URL) is sent with the call signals so that equipment at the called port location can go to an identified location and obtain the referenced call related information; and transmitting the call related information on the communication link to an output device of the called person contemporaneously with call signals for establishing the communication link for alerting said available called person characteristics of the incoming call to decide whether to accept, reject or transfer the request for the telephone session without requiring the available called person to enter into the telephonic session.

2. The method according to claim 1, characterized in that the telephonic communication session is a call from the group consisting of a telephone call, a text-chat call, and a video conference call.

3. The method according to claim 1, characterized in that the call-related information has been defined by the calling person or optionally from a repository of call related messages.

4. The method according to claim 1, characterized in that the call-related information includes an indication of the calling person, an indication of the purpose of the call or an indication of the urgency of said call.

5. The method according to claim 1, characterized in that the call-related information includes identifying the calling person through a sensor from the group consisting of a voice-analyzer, a scanner, and a camera.

6. The method according to claim 1, characterized in that the call-related information includes information from the group consisting of text, photo, image, graphic, animation, audio, clip, video clip, and combinations thereof.

7. The method according to claim 1, characterized in that the call-related information is transmitted and the session is afterwards interrupted if the called person does not respond.

8. The method according to claim 1, characterized in that an alerting signal is provided to the called person to indicate that a call is incoming, and wherein said alerting signal is represented by the call-related information.

9. The method of claim 1, characterized in that the call related information is encoded in a signalling message which is sent from the calling party to the called party during the call set-up phase.

10. An apparatus at a calling location for setting up a telephonic communication session with a called device, whereby call related information is generatable or selectable, said call related information being related to a calling person or the subject of said session, comprising
    a telephonic connection to a network and a unit for enabling said session,
    a unit for generating or selecting said call related information by the calling person without first attempting to establish a telephone link to said called person,
    a unit for processing said call related information, and
    a transmitter for transmitting said call related information encoded in a signalling message accompanying the call set up signals which are sent from the calling party to the called party for the establishment of the communication session via said network to the called device to alert a person at the called device of the nature of the telephonic communication enabling the person at the called device to accept or not take the telephonic communication based on information in the signalling messages without first engaging in the telephonic communication session.

11. The apparatus according to claim 10 wherein the call related information being implemented and sent in a setup message for the telephonic communication session using ISDN and the standard Q.931.

12. The apparatus according to claim 10 wherein the call related information being implemented and sent in a setup message for the telephonic communication session using IP and H.323.

13. The apparatus according to claim 10 in combination with receiving apparatus in the called device responsive to the call related information encoded in the signalling message.

14. The apparatus according to claim 13 wherein reference to call related information is generated by the calling location in form of an URL and the receiving apparatus at the called location includes apparatus automatically responsive to the URL to go to an identified location and obtain the call related information.

15. The apparatus according to claim 14 wherein the call related information being implemented and sent in a setup message for the telephonic communication session using ISDN and the standard Q.931.

16. The apparatus according to claim 14 wherein the call related information being implemented and sent in a setup message for the telephonic communication session using IP and H.323.

17. A computer program product on a computer readable medium comprising machine readable code which, when being executed by a processor of a calling device, the computer program product comprising:
    software for setting up a telephonic communication session between the calling person at said calling device and an available called party at the called device,
    software for creating or selecting call related information without first attempting to establish a connection for the telephonic communication session which relates to said calling device's user or the subject of said session,
    software for sending, with the call signals, a reference to the call related information in the form of an URL; and
    software for transmitting said call related information via a network to said called device prior to a contemporaneous attempt to establish the connection to allow software at the called port location to go to an identified location and obtain the call related information enabling the called party to determine the nature of the telephonic communication session and accept or reject the telephonic communication without entering into the session.

18. A computer program product on a computer readable medium comprising machine readable code which, when being executed by a processor of a called device, the computer program product comprising:
    software for setting up a telephonic communication session between a calling device and said called device,
    software for receiving a reference to call related information in form of an URL transmitted in the call set up signals to establish the communication session via a network from said calling device, said call related information relating to said calling device's user or the subject of said session; and
    software at the called device responsive to the URL to go to an identified location and obtain the call related information to provide; said call related information contemporaneously with signals to establish the telephonic communication session with the called device allowing a waiting party on an open telephone line to decide whether to accept or reject entering into the telephonic communication session without that waiting party first entering into the telephonic communication session.

* * * * *